Patented Sept. 20, 1932

1,878,182

UNITED STATES PATENT OFFICE

CHAMPLAIN L. RILEY, OF NORTH PLAINFIELD, NEW JERSEY, ASSIGNOR TO INDUSTRIAL ASSOCIATES, INC., OF NEW YORK, N. Y., A CORPORATION OF NEW YORK

MANUFACTURE OF CASEIN

No Drawing.   Application filed July 12, 1928.   Serial No. 292,326.

This invention relates to the manufacture of casein.

In the manufacture of casein the curd is prepared by the addition of acid to skim milk. After the crud has formed it is separated from the whey and washed. Heretofore it has been customary to squeeze out entrained water and break the curd up into small pieces which are dried on trays in a tunnel dryer, after which the curd is ground and prepared for various uses. This method of first drying and then grinding the curd is laborious and expensive, and results in a product which contains considerable dust and is not of uniform fineness.

The present invention has as an object an improved method of treating the curd after it is separated from the whey and washed as well as the improved product obtained through such treatment.

According to the present invention the curd is taken as it comes from the wash tank containing such water as it may hold. No effort is made to squeeze out excess water. The curd is then fed at a suitable rate through a tube mill or other grinding apparatus where it is ground and crushed in the presence of its entrained water thereby forming a suspension of finely divided casein curd in water having the consistency of a smooth cream. Such consistency is easily obtained as a properly prepared firm curd contains about the amount of water suitable for the preparation of a smooth creamy mixture of casein and water when the curd is milled. The curd is much more easily ground before it is dried than afterwards as it is soft and the water making a fluid mixture prevents the formation of very fine crushed particles.

The fluid mixture of casein and water may be continuously discharged from the mill to a drying apparatus having a spray drier as one element. An example of an apparatus by means of which the fluid mixture of casein and water may be continuously dried is disclosed in the copending application of C. L. Riley, Serial No. 253,037 filed February 9, 1928. This apparatus consists essentially of a drying chamber within which is provided a centrifugal spray device. Hot air or gas is introduced into the chamber near the ceiling and the casein mixture is centrifugally atomized in the entering stream of heated air by the spray device. The water is evaporated and the solid casein falls to the floor as a dry powder of remarkably uniform grain. The rapid evaporation of the water as a mist cools the air and protects from damage the casein which is sensitive to heat.

According to the process above described the casein is ground before it is dried and the product obtained is of substantially uniform fineness and contains no dust as the formation thereof is prevented. The process is much less laborious and much less expensive than the former methods of drying the curd with the subsequent grinding thereof. The product obtained by the process is of better color, size and texture than casein formerly obtained and is also substantially free from dust.

The above described process may be continuous from the separation of the curd from the whey to the collection of the dry casein. The moist curd may be passed through a tube mill at such a rate that when it is discharged it forms with the water a mixture having the consistency of smooth cream, or it may be left slightly granular in texture in case a coarse grain is required in the dried product. This mixture may then be directly conducted through a suitable conduit to the centrifugal spray drier by means of which the mixture is continuously atomized into the stream of heated air. Such continuous operation reduces the handling of the mixture and results in reduced operating costs.

Casein produced by the above described process consists of dried spongy particles which are generally spherical or bulbous in shape and varying but slightly in size. The major portion of the particles are substantially uniform in size and the remainder is of smaller size, a very slight percentage being in the form of dust. In one particular instance it was found that all of the particles passed through a 60 mesh screen, 72% were stopped by 120 mesh screen, 23% were stopped by a 200 mesh screen while only 4% passed through 200 mesh screen, this latter portion constituting the dust content of the product. This relationship of the particles' sizes is a fair example of the product obtained by this process.

A sample of casein produced by first drying and then grinding was found to vary much more widely in sizes of particles and to contain twice as much dust. Casein produced by the spray drying process goes into solution very quickly and does not form lumps when alkali is added as in the case of ground casein containing considerable dust. The water content can be controlled thus rendering the product more uniform in moisture contained than is possible with casein produced by drying in a kiln.

I claim:—

1. The method of curing casein which comprises crushing fresh washed casein curd saturated with water to produce a suspension of finely divided curd in water, spraying the suspension into a heated atmosphere to evaporate the water and continuously removing the dried casein from the zone of high temperature.

2. The method of curing casein which comprises crushing fresh washed casein curd saturated with water to produce a suspension of finely divided curd in water, centrifugally spraying the suspension into a heated atmosphere to evaporate the water and continuously removing dried casein from the high temperature zone.

In testimony whereof, I have signed my name to this specification.

CHAMPLAIN L. RILEY.